Patented Apr. 27, 1943

2,317,738

UNITED STATES PATENT OFFICE 2,317,738

REACTION PRODUCT OF ALDEHYDES AND TRIAZINE DERIVATIVES

Gaetano F. D'Alelio and James W. Underwood, Pittsfield, Mass., assignors to General Electric Company, a corporation of New York No Drawing. Application June 27, 1941, Serial No. 400,148

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol malamine, etc., and an s-triazinyl carbamyl-alkyl sulfide (s-triazinyl-thio-acylamide) or an s-triazinyl thiocarbamyl-alkyl sulfide (s-triazinyl-thio-acylthioamide) corresponding to the following general formula:

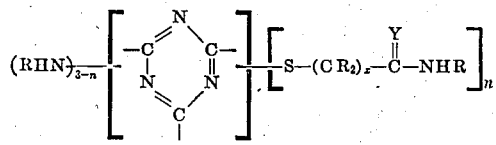

In the above formula $n$ represents an integer and is at least 1 and not more than 3, $x$ is an integer and is at least 1 and not more than 2, Y represents a member of the class consisting of oxygen and sulfur, and R represents a member of the class consisting of hydrogen and monovalent hydrocarbon and halo-hydrocarbon radicals, numerous examples of which hereafter are given. Since $x$ represents an integer which is 1 or 2, it will be seen that the linkage of the carbamyl-alkyl (or thiocarbamyl-alkyl) group to the sulfur atom in all cases will be alpha or beta to the carbamyl (—CONHR) or thiocarbamyl (—CSNHR) group. It also will be observed that linkage of the triazinyl grouping to the sulfur atom is through a carbon atom. From a consideration of the formula it further will be seen that when $n$ is 3 there will be no amino (—NHR) groups attached to the triazine nucleus. Instead of the s-triazinyl carbamyl-alkyl and thiocarbamyl-alkyl sulfides represented by the above formula, corresponding derivatives of the asymmetric triazines or of the vicinal triazines may be used.

Illustrative examples of monovalent hydrocarbon radicals that R in the above formula may represent are aliphatic (e. g., methyl, ethyl, propyl, isopropyl, butyl, secondary butyl, isobutyl, amyl, isoamyl, hexyl, etc.), including cyclo-aliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlormethyl, dichlorphenyl, ethyl chlorphenyl, phenyl chlorethyl, bromethyl, bromtolyl, etc. Preferably R is hydrogen.

More specific examples of s-triazinyl carbamyl-alkyl and thiocarbamyl-alkyl sulfides that may be employed in producing our new condensation products are s-triazinyl tri-(carbamyl-methyl sulfide), s-triazinyl tri-(carbamyl-ethyl sulfide), s-triazinyl tri-(thiocarbamyl-methyl sulfide), s-triazinyl tri-(thiocarbamyl-ethyl sulfide), the monoamino (—NHR) s-triazinyl di-(carbamyl-methyl sulfides), the monoamino (—NHR) s-triazinyl di-(thiocarbamyl-methyl sulfides), the monoamino (—NHR) s-triazinyl di-(carbamyl-ethyl sulfides), the monoamino (—NHR) s-triazinyl di-(thiocarbamyl-ethyl sulfides), the diamino [(—NHR)$_2$] s-triazinyl mono-(carbamyl-methyl sulfides), the diamino [(—NHR)$_2$] s-triazinyl mono-(thiocarbamyl-methyl sulfides), the diamino [(—NHR)$_2$] s-triazinyl mono-(carbamyl-ethyl sulfides), and the diamino [(—NHR)$_2$] s-triazinyl mono-(thiocarbamyl-ethyl sulfides).

The triazinyl carbamyl-alkyl and thiocarbamyl-alkyl sulfides that are used in carrying the present invention into effect are more fully described and are specifically claimed in our copending application Serial No. 400,151, filed concurrently herewith, now Patent No. 2,295,562, issued September 15, 1942, and assigned to the same assignee as the present invention.

Other and more specific examples of triazinyl carbamyl-alkyl and thiocarbamyl-alkyl sulfides that may be used in producing our new condensation products are listed below:

4,6-diamino s-triazinyl-2 thiocarbamyl-methyl sulfide
s-Triazinyl-2,4,6 tri-(beta-carbamyl-ethyl sulfide)
6-amino s-triazinyl-2,4 di-(carbamyl-methyl sulfide)
6-amino s-triazinyl-2,4 di-(thiocarbamyl-methyl sulfide)
6-amino s-triazinyl 2-beta-carbamyl-ethyl 4-carbamyl-methyl disulfide
4-anilino 6-methylamino s-triazinyl-2 carbamyl-methyl sulfide
4,6-diamino s-triazinyl-2 beta-carbamyl-ethyl sulfide
6-amino 4-anilino s-triazinyl-2 phenylthiocarbamyl-methyl sulfide
6-amino 4-anilino s-triazinyl-2 thiocarbamyl-phenyl-methyl sulfide
6-methylamino 4-toluido s-triazinyl-2 beta-carbamyl-ethyl sulfide
6-methylamino 4-anilino s-triazinyl-2 phenyl-thiocarbamyl-methyl sulfide
4,6-diamino s-triazinyl-2 beta-cyclohexylthio-carbamyl-ethyl sulfide 4,6 - diamino s - triazinyl-2 alpha-thiocarbamyl-ethyl sulfide
4,6-di-(methylamino) s-triazinyl-2 beta-(alpha-cyclohexyl carbamyl-butyl) sulfide
4,6-di-toluido s-triazinyl-2 beta-(gamma-phenyl methyl-thiocarbamyl-propyl) sulfide
4,6 - di - (cyclohexylamino) s - triazinyl-2 alpha-phenylthiocarbamyl-propyl sulfide
6 - naphthylamino s - triazinyl - 2,4 di - (alpha-phenylcarbamyl-propyl sulfide)
6-ethylamino s-triazinyl-2,4 di-(carbamyl-chlorphenyl-methyl sulfide)
s-Triazinyl-2,4,6 tri-(benzylthiocarbamyl-methyl sulfide)
s-Triazinyl-2,4,6 tri-[beta-(alpha-phenyl carbamyl-butyl) sulfide]
6 - amino s - triazinyl 2-thiocarbamyl-methyl 4-carbamyl-methyl disulfide The formulas for the above compounds are shown in our above-identified copending application Serial No. 400,151.

The present invention is based on our discovery that new and valuable materials of particular utility in the plastics and coating arts can be produced by effecting reaction between ingredients comprising essentially an aldehyde, including polymeric aldehydes and aldehyde-addition products, and certain triazinyl carbamyl-alkyl or triazinyl thiocarbamyl-alkyl sulfides, numerous examples of which have been given above and in our above-identified copending application.

Resins heretofore have been made by condensing an aldehyde with certain thioammeline ethers, but such known resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulfides used in practicing this invention contain aldehyde-reactable thio groups attached to the triazine nucleus, thereby imparting to the condensation products of such sulfides with aldehydes increased heat-, water- and abrasion-resistance and improved curing characteristics as compared with known resinous condensation products of an aldehyde and a thioammeline ether.

In practicing our invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative used by the applicants may be carried out in the presence of solvents or diluents, fillers, other natural or synthetic resinous bodies, or while admixed with other materials which also can react with the aldehydic reactant or with the triazine derivative, e. g., ketones, urea, thiourea, selenourea, iminourea, (guanidine), substituted ureas, thioureas, selenoureas and iminoureas, numerous examples of which are given in various copending applications of one of us (Gaetano F. D'Alelio), for instance, in D'Alelio copending application Serial No. 363,037, filed October 26, 1940; monoamides of monocarboxylic and polycarboxylic acids and polyamides of polycarboxylic acids, e. g., acetamide, halogenated acetamides, e. g., a chlorinated acetamide, maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; 5-membered aminotriazines, which compounds also may be named aminotriazoles (amidogentriazoles), and aminotriazines (amidogentriazines), e. g., melamine, ammeline, ammelide, numerous other examples being given in various D'Alelio copending applications, for instance, in D'Alelio copending application Serial No. 377,524, filed Feb. 5, 1941, and in applications referred to in said copending application; aminodiazines and aminodiazoles; phenol and substituted phenols, e. g., the cresols, the xylenols, the tertiary alkyl phenols and other phenols such as mentioned in D'Alelio Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the triazine derivative and the aldehyde by mixing all the reactants and effecting condensation therebetween or by various permutations of the reactants as described, for example, in D'Alelio copending application Serial No. 363,037 with particular reference to reactions involving a urea, an aldehyde and a semi-amide of oxalic acid. For instance, we may form a partial condensation product of ingredients comprising urea, a diamino triazinyl carbamyl-methyl sulfide and formaldehyde and thereafter effect reaction between this partial condensation product and, for example, a chlorinated acetamide to obtain a heat-curable composition.

Some of the condensation products of this invention are thermoplastic materials even at an advanced stage of condensation while others are thermosetting or potentially thermosetting bodies which convert under heat or under heat and pressure to an insoluble, infusible state. Those materials which are slightly thermoelastic are particularly useful in producing molding compounds suitable for use in making pieces to be molded over screws (as in making bottle caps). The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show good flow characteristics during a short curing cycle. This is a property that is particularly desirable in a molding compound. The molded resins are of exceptionally light color. Products of any desired colors can be obtained by incorporating a suitable pigment into the molding compound. The molded articles have good surface finish and excellent resistance to water and arcing. They have a high dielectric strength. The pH at which the heat-curable resins of this invention cure generally is of the order of 5.0 to 8.0. Basic fillers such as asbestos, therefore, can be used satisfactorily in the production of molding compounds without detrimental effect upon the rapidity of cure of the compound.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 4,6-diamino s-triazinyl-2 carbamyl-methyl sulfide | 40.0 |
| Aqueous formaldehyde (approx. 37.1% HCHO) | 48.6 |
| Aqueous ammonia (approx. 28% NH₃) | 4.0 |
| Sodium hydroxide in 2.5 parts water | 0.05 |
| Water | 10.0 |

The above components were heated together under reflux at the boiling temperature of the mass for 15 minutes, yielding a clear resinous syrup having a pH of 7.61. Upon testing this syrup on a 130° C. hot plate it was found to body slowly to a solid resin having a very high fusion point. The addition of a small amount (0.5 part) of chloracetamide (monochloracetamide) to the above resinous syrup, followed by refluxing for an additional 5 minutes to cause the chloracetamide to intercondense with the partial condensation product of the triazine derivative and formaldehyde, produced a resin that cured fairly rapidly to an insoluble, infusible state. A molding compound was produced by mixing this resinous syrup with 35 parts alpha cellulose in flock form and 0.2 part of a mold lubricant, specifically zinc stearate. The wet molding compound was oven dried at 60° C. for 70 minutes, followed by drying at room temperature for approximately 15 hours. A sample of the dried compound was molded for 3 minutes at 130° C. under a pressure of 2,000 pounds per square inch. The molded article was well-cured throughout and showed good flow characteristics during molding. The molded piece was very resistant to water as evidenced by the fact that, when immersed in boiling water for 15 minutes followed by immersion in cold water for 5 minutes, it absorbed only 2.7% by weight of water.

Instead of employing chloracetamide as above described in accelerating the curing of the potentially reactive resinous material, heat-convertible compositions may be produced by adding to the syrup direct or active curing catalysts (e. g., phthalic anhydride, citric acid, etc.), or latent curing catalysts (e. g., sodium chloracetate, N-diethyl chloracetamide, glycine ethyl ester hydrochloride, etc.) or by intercondensation with other curing reactants (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanol amine hydrochloride, nitrourea, glycine, sulfamic acid, chloracetyl urea, chloracetone, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance, in copending application Serial No. 346,962, filed July 23, 1940, and Serial No. 354,395, filed August 27, 1940, both of which applications are assigned to the same assignee as the present invention.

*Example 2*

| | Parts |
|---|---|
| 4,6-diamino s-triazinyl-2 carbamyl-methyl sulfide | 20.0 |
| Urea | 24.0 |
| Aqueous formaldehyde (approx. 37.1% HCHO) | 81.0 |
| Aqueous ammonia (approx. 28% NH₃) | 4.0 |
| Sodium hydroxide in 2.5 parts water | 0.05 | were heated together under reflux for 30 minutes, yielding a clear resinous syrup. This syrup cured slowly on a 130° C. hot plate. The addition of 0.5 part chloracetamide to the syrup, followed by refluxing for an additional 10 minutes, produced a resin which cured to the insoluble, infusible state. A molding compound was produced from the syrup into which the chloracetamide had been intercondensed by mixing therewith 35 parts alpha flock and 0.2 part zinc stearate. The wet compound was dried for 95 minutes at 56° C. A sample of the dried compound was molded for 4 minutes at 130° C. under a pressure of 2,000 pounds per square inch. The molded piece was light in color and had a glossy surface finish. When the molded article was tested for water absorption as described under Example 1, it showed only 2.05% water absorbed. The flow of the molding compound during molding was very good. Similar results are obtained with molding periods of the order of 3 minutes.

*Example 3*

| | Parts |
|---|---|
| 4,6-diamino s-triazinyl-2 carbamyl-methyl sulfide | 20.0 |
| Sulfanilamide | 17.1 |
| Aqueous formaldehyde (approx. 37.1% HCHO) | 48.6 |
| Sodium hydroxide in 2.5 parts water | 0.05 |
| Water | 20.0 | were heated together under reflux for 15 minutes. A large mass of insoluble resinous material was precipitated but enough of the resin apparently dissolved to yield a syrupy mother liquor. When the resinous precipitate was heated on a 130° C. hot plate a thermoplastic product was obtained. A heat-curable resin was produced by incorporating into the syrupy solution active or latent curing catalysts or by intercondensation with curing reactants as described under Example 1. The addition of sulfamic acid to the syrupy solution yielded a heat-convertible resin that cured rapidly under heat to an insoluble, infusible state.

*Example 4*

| | Parts |
|---|---|
| 4,6-diamino s-triazinyl-2 carbamyl-methyl sulfide | 20.0 |
| Dimethylol urea (commercial grade containing approx. 11% by weight of water) | 40.5 |
| Aqueous ammonia (approx. 28% NH₃) | 4.0 |
| Sodium hydroxide in 2.5 parts water | 0.05 |
| Water | 60.0 |

The above components were heated together under reflux for 30 minutes, after which 0.5 part chloracetamide was added and refluxing was continued for an additional 5 minutes. The resulting syrupy condensation product was mixed with 35 parts alpha cellulose and 0.2 part zinc stearate to form a molding compound. The wet compound was dried for 3 hours at 60° C. Samples of the dried compound were molded at 130° C. under a pressure of 2,000 pounds per square inch. In one case the time of molding was 4 minutes and in the other, 5 minutes. Both samples were well-cured throughout and showed good flow characteristics during molding. The molded pieces were light in color and had a smooth finish. The sample which had been molded for 4 minutes was tested for water absorption as described under Example 1. The percentage of water retained on this test was 4.08%.

*Example 5*

| | Parts |
|---|---|
| 4,6-diamino s-triazinyl-2 carbamyl-methyl sulfide | 60.0 |
| Acrolein | 50.4 |
| Sodium hydroxide in 0.5 part water | 0.1 |
| Water | 10.0 | were heated together under reflux for 15 minutes to yield a clear dark syrup. This syrup bodied to a solid resinous mass when heated on a 130° C. hot plate. Satisfactory syrups also are obtained by using longer reflux periods.

*Example 6*

| | Parts |
|---|---|
| 4,6-diamino s-triazinyl-2 carbamyl-methyl sulfide | 60.0 |
| Butyl alcohol | 111.0 |
| Aqueous formaldehyde (approx. 37.1% HCHO) | 97.2 |
| Aqueous ammonia (approx. 28% NH₃) | 6.0 |
| Sodium hydroxide in 2.5 parts water | 0.1 |

The above components were heated together under reflux for 20 minutes. The resulting product was a clear, light-colored resinous syrup. This syrup bodied readily to a thermoplastic resin when heated on a 130° C. hot plate. Heat-curable resins were produced by adding chloracetamide, sodium chloracetate, sulfamic acid and other active and latent curing catalysts and curing reactants as described under Example 1. A small amount of hydrochloric acid also is suitable for converting the thermoplastic material to an insoluble or cured state. The initial condensation product was soluble in both water and ethyl alcohol.

*Example 7*

| | Parts |
|---|---|
| 4,6-diamino s-triazinyl-2 carbamyl-methyl sulfide | 60.0 |
| Glycerine | 18.0 |
| Aqueous formaldehyde (approx. 37.1% HCHO) | 97.2 |
| Aqueous ammonia (approx. 28% NH₃) | 5.0 |
| Sodium hydroxide in 0.5 part water | 0.1 |

The above components were heated together under reflux for 15 minutes, yielding a clear water-soluble syrup. When this syrup was heated on a 130° C. hot plate it cured very slowly. A more rapidly curing thermosetting resinous composition is produced by incorporating into the syrup chloracetamide or other curing reactants or active or latent curing catalysts as described under Example 1. Chloracetamide yields a resin which cures rather slowly to the insoluble, infusible state as compared with agents such, for example, as hydrochloric acid. The product of this example would be especially suitable for use in modifying rapidly curing resins to control their curing characteristics.

*Example 8*

| | Parts |
|---|---|
| 4,6-diamino s-triazinyl-2 carbamyl-methyl sulfide | 60.0 |
| Polyvinyl alcohol | 79.2 |
| Aqueous formaldehyde (approx. 37.1% HCHO) | 194.4 |
| Sodium hydroxide in 1 part water | 0.2 |
| Water | 40.0 |

The above components were heated together under reflux for 15 minutes, resulting in a clear, light-colored resinous syrup. When a sample of this syrup was heated on a 135° C. hot plate it bodied fairly rapidly to a thermo-plastic mass. The addition of a small amount of dilute hydrochloric acid caused a rapidly thermosetting resin to be formed. A film of the unmodified resinous syrup of this example was baked on a glass plate. The baked film was clear, transparent and hard. The product of this example is especially suitable for use in the production of varnishes and as modifiers of other synthetic resinous materials.

Example 9

| | Parts |
|---|---|
| 4,6-diamino s-triazinyl-2 carbamyl-methyl sulfide | 60.0 |
| Diethyl malonate | 48.0 |
| Aqueous formaldehyde (approx. 37.1% HCHO) | 145.8 |
| Sodium hydroxide in 1 part water | 0.2 | were heated together under reflux for 15 minutes to yield a clear syrup. When this syrup was heated on a hot plate it slowly cured. Heat-convertible resins of rapid-curing characteristics are produced by adding active or latent curing catalysts or by intercondensation with curing reactants as described under Example 1. Sulfamic acid gave a thermosetting resin which cured more rapidly to the insoluble, infusible state than was obtained by the use of chloracetamide.

Example 10

| | Parts |
|---|---|
| 4,6-diamino s-triazinyl-2 phenylcarbamyl-methyl sulfide | 27.6 |
| Aqueous formaldehyde (approx. 37.1% HCHO) | 32.4 |
| Sodium hydroxide in a small amount of water | 0.03 |
| Water | 15.0 |
| Chloracetamide | 0.3 |

All of the above components with the exception of the chloracetamide were heated together under reflux for 15 minutes. The chloracetamide was then added and refluxing was continued for an additional 5 minutes to cause the chloracetamide to intercondense with the partial condensation product of the triazine derivative and formaldehyde. The resulting syrup was mixed with 21 parts alpha cellulose in flock form and 0.2 part of zinc stearate. The wet compound was dried at 60° C. until sufficiently free from moisture so that it could be molded satisfactorily. A sample of the dried compound was molded for 10 minutes at 135° C. under a pressure of 2,500 pounds per square inch. The molded piece was well-cured throughout.

Example 11

| | Parts |
|---|---|
| 4,6-diamino s-triazinyl-2 phenylcarbamyl-methyl sulfide | 8.10 |
| Urea | 7.2 |
| Aqueous formaldehyde (approx. 37.1% HCHO) | 48.6 |
| Sodium hydroxide in a small amount of water | 0.03 |
| Chloracetamide | 0.3 |

All of the above components with the exception of the chloracetamide were heated together under reflux for 24 minutes. The chloracetamide was now added and refluxing was continued for an additional 13 minutes. The pH of the resulting syrup was 4.55. This syrup was mixed with 21.9 parts alpha-cellulose and 0.2 part zinc stearate to form a molding compound. The wet compound was dried at 60° C. A heat-resistant piece having excellent cure and cohesive properties was obtained when a sample of the dried compound was molded under heat and pressure.

Example 12

| | Parts |
|---|---|
| 4,6-diamino s-triazinyl-2 phenylcarbamyl-methyl sulfide | 20.7 |
| Para-toluenesulfonamide | 12.8 |
| Aqueous formaldehyde (approx. 37.1% HCHO) | 48.6 |
| Sodium hydroxide in a small amount of water | 0.04 | were heated together under reflux for 15 minutes. The resinified syrup was treated with a curing agent, specifically chloracetamide in one case and sulfamic acid in another, and the mixture then refluxed until the curing agent had dissolved. The resulting product in each case was mixed with 27.5 parts alpha cellulose and 0.2 part zinc stearate to form molding compounds. The wet compounds were dried at 60° C. and samples of the dried compounds then molded at 135° C. under a pressure of 2,000 pounds per square inch. Well-plasticized and well-cured molded pieces were obtained.

Example 13

| | Parts |
|---|---|
| 4,6-diamino s-triazinyl-2 phenylcarbamyl-methyl sulfide | 27.6 |
| Dimethylol urea (commercial grade containing approx. 11% by weight of water) | 53.5 |
| Sodium hydroxide in a small amount of water | 0.04 |
| Chloracetamide | 0.4 |

All of the above components with the exception of the chloracetamide were heated together under reflux for 25 minutes. The chloracetamide was now added and refluxing was continued for an additional 2 minutes. The pH of the resulting syrup was 5.34. A molding compound was made from this syrup by mixing it with 28.1 parts alpha cellulose and 0.2 part zinc stearate. The wet compound was dried at 60° C. A well-molded piece was obtained by pressing a sample of the dried compound for 5 minutes at 135° C. under a pressure of 2,000 pounds per square inch.

Example 14

| | Parts |
|---|---|
| 4,6-diamino s-triazinyl-2 phenylcarbamyl-methyl sulfide | 1.9 |
| Phenol-formaldehyde resinous partial condensation product | 60.0 |
| Aqueous ammonia (approx. 28% NH₃) | 0.5 |
| Oxalic acid | 1.1 |

The phenolic resin mentioned in the above formula was prepared by heating a mixture of 90 parts synthetic phenol, 195 parts aqueous formaldehyde containing approximately 37.1% HCHO and 2.85 parts potassium carbonate at 65° C. for 4 hours. The above-stated amounts of triazine derivative and phenol-formaldehyde partial condensation product, together with the ammonia (0.5 part), were heated together under reflux for 65 minutes. The oxalic acid dissolved in water was added to the resulting syrup, which was then mixed with 23.7 parts alpha cellulose and 0.2 part zinc stearate. The wet compound was dried and a sample of the dried compound was molded for 3 minutes at 135° C. under a pressure of 2,000 pounds per square inch. A well-cured molded article having excellent cohesive properties was obtained. The molding compound showed good flow characteristics during molding.

Example 15

| | Parts |
|---|---|
| 4,6-diamino s-triazinyl-2 phenylcarbamylmethyl sulfide | 10.4 |
| Acrolein | 8.4 |
| Sodium hydroxide in a small amount of water | 0.01 |
| Water | 10.0 | were heated together under reflux for 15 minutes. The resinified syrup is suitable for use in the production of molding compounds. Heat-convertible resins are produced by incorporating either into the syrupy mass or into the dehydrated resin active or latent curing catalysts or by intercondensation with curing reactants as described under Example 1. Well-cured resins were produced by heating the resinified syrup with small amounts of citric acid, phthalic acid, sulfamic acid, etc., on a 140° C. hot plate.

Example 16

| | Parts |
|---|---|
| 4,6-diamino s-triazinyl-2 phenylcarbamylmethyl sulfide | 10.4 |
| Furfural | 15.8 |
| Sodium hydroxide in a small amount of water | 0.01 | were heated together under reflux for 15 minutes. The resulting product is suitable for use in the production of molding compounds. A heat-hardenable resinous composition is produced by incorporating into the resinous syrup or into the dehydrated resin active or latent curing catalysts or curing reactants such as described under Example 1.

Example 17

| | Parts |
|---|---|
| 4,6-diamino s-triazinyl-2 phenylcarbamylmethyl sulfide | 41.4 |
| Aqueous formaldehyde (approx. 37.1% HCHO) | 48.6 |
| Butyl alcohol | 55.5 |
| Sodium hydroxide in a small amount of water | 0.07 | were heated together under reflux for 20 minutes. The resulting syrup was dehydrated by heating it on a steam plate. The dehydrated syrup was found to be soluble in solvents such, for example, as ethyl alcohol, Solvatone, ethylene glycol, etc. The solubility and film-forming characteristics of this resin make it especially suitable for use in the production of spirit and baking varnishes. It may be used as a modifier of varnishes of the aminoplast and alkyd-resin types. Heat-hardenable resins are produced by incorporating into the resinous syrup active or latent curing catalysts or by intercondensation with curing reactants as described under Example 1. A film of the resinous syrup catalyzed with a small amount of hydrochloric acid was applied to a glass plate, which thereafter was baked for several hours at 60° C. A hard, transparent, baked film of glossy appearance was produced on the plate.

Example 18

| | Parts |
|---|---|
| 4,6-diamino s-triazinyl-2 phenylcarbamylmethyl sulfide | 20.7 |
| Acetamide | 4.4 |
| Aqueous formaldehyde (approx. 37.1% HCHO) | 48.6 |
| Sodium hydroxide in a small amount of water | 0.04 | were heated together under reflux for 20 minutes. The plasticizing effect of the acetamide was evident from the relatively slow curing of the dehydrated resin when tested on a 140° hot plate. Active or latent curing catalysts or curing reactants of the kinds mentioned under Example 1 may be added as desired. The product of this example would be suitable for use where slowly curing resins are advantageous.

Example 19

| | Parts |
|---|---|
| 4,6-diamino s-triazinyl-2 phenylcarbamylmethyl sulfide | 20.7 |
| Diethyl malonate | 12.0 |
| Aqueous formaldehyde (approx. 37.1% HCHO) | 48.6 |
| Sodium hydroxide in a small amount of water | 0.04 | were heated together under reflux for 17 minutes, yielding a product very similar to that of Example 18. The diethyl malonate internally plasticizes the resin in much the same way as does the acetamide.

Example 20

| | Parts |
|---|---|
| 4,6-diamino s-triazinyl-2 phenylcarbamylmethyl sulfide | 41.4 |
| Glycerine | 13.8 |
| Aqueous formaldehyde (approx. 37.1% HCHO) | 97.2 |
| Sodium hydroxide in a small amount of water | 0.08 | were heated together under reflux for 25 minutes. The clear resinous syrup thereby produced was dehydrated by heating it on a steam plate. The resinified syrup is soluble in solvents such, for example, as ethyl alcohol, Solvatone, and ethylene glycol. This resin may be used in the production of varnishes as described under Example 17.

Example 21

| | Parts |
|---|---|
| 4,6-diamino s-triazinyl-2 phenylcarbamylmethyl sulfide | 20.7 |
| Polyvinyl alcohol | 3.4 |
| Aqueous formaldehyde (approx. 37.1% HCHO) | 48.6 |
| Sodium hydroxide in a small amount of water | 0.04 |
| Water | 100.0 | were heated together under reflux for 20 minutes. This resulted in the formation of a partly resinified syrup. This syrup is suitable for use in the manufacture of baking varnishes. When this resinous syrup was treated with a curing agent, specifically a small amount of hydrochloric acid, and the resulting product baked in film form on a glass surface for several hours at 60° C., a baked film that was opaque, hard, water-resistant, smooth and that adhered tightly to the glass surface was obtained. The resinous composition of this example also may be used in the preparation of molding compounds after incorporating therein active or latent curing catalysts or curing reactants as described under Example 1.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacholein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in D'Alelio copending application Serial No. 377,524, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and active methylene-containing bodies may be employed, e. g., mixtures of formaldehyde and methylol compounds such, for instance, as dimethylol urea and trimethylol melamine.

The ratio of the aldehydric reactant to the triazine derivative may be varied over a wide range, but ordinarily the reactants are employed in an amount corresponding to at least one mol of the aldehyde, specifically formaldehyde, for each mol of the triazine derivative. Thus we may use, for example, from one to five or six mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components.

Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, e. g., acrylonitrile, methacrylonitrile, succinonitrile, including halogenated nitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminodiazines (e. g., 2,4,6-triaminopyrimidine, 2,4-diaminoquinazoline, etc.), or with the aminotriazines other than those with which this invention is concerned, or with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a triazinyl carbamyl-alkyl sulfide (or a triazinyl thiocarbamyl-alkyl sulfide) of the kind herein described and an aldehyde, e. g., formaldehyde, we may cause an aldehyde to condense with a salt of the triazine derivative or with a mixture of the triazine derivative and a salt (organic or inorganic) thereof. As examples of salts of the triazine derivatives that may be used, we mention salts of mono- and di-amino s-triazinyl carbamyl-methyl, carbamyl-ethyl, thiocarbamyl-methyl and thiocarbamyl-ethyl sulfides and organic or inorganic acids as, for instance, hydrochloric, sulfuric, phosphoric, boric, acetic, chloracetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and an organic sulfide corresponding to the general formula

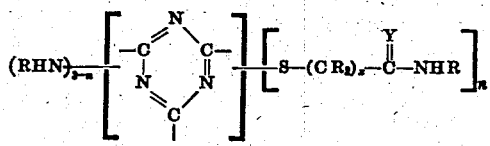

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

2. A composition as in claim 1 wherein the aldehyde is formaldehyde.

3. A composition comprising a condensation product of ingredients comprising an aldehyde and an organic sulfide corresponding to the general formula

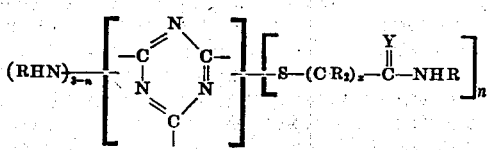

where $n$ is an integer and is at least 1 and not more than 3, $x$ is an integer and is at least 1 and not more than 2, Y is a member of the class consisting of oxygen and sulfur, and R represents hydrogen.

4. A composition comprising a condensation product of ingredients comprising an aldehyde and an organic sulfide corresponding to the general formula

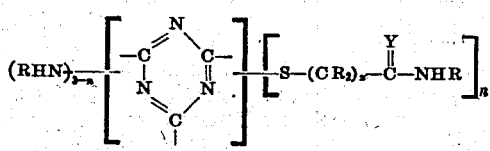

where $n$ is an integer and is at least 1 and not more than 3, $x$ is an integer and is at least 1 and not more than 2, R represents hydrogen and Y represents oxygen.

5. A composition comprising a condensation product of ingredients comprising formaldehyde and an organic sulfide corresponding to the general formula

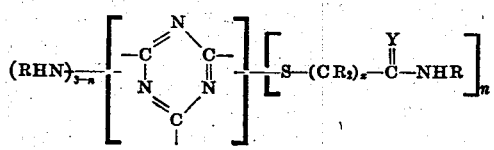

where $n$ is an integer and is at least 1 and not more than 3, $x$ is 1, R represents hydrogen and Y represents oxygen.

6. A resinous composition comprising the product of reaction of ingredients comprising symmetrical triazinyl-2,4,6 tri-(carbamyl-methyl sulfide) and an aldehyde.

7. A resinous composition comprising the product of reaction of ingredients comprising a monoamino s-triazinyl di-(carbamyl-methyl sulfide) and an aldehyde.

8. A resinous composition comprising the product of reaction of ingredients comprising a diamino s-triazinyl carbamyl-methyl sulfide and an aldehyde.

9. A resinous composition comprising the product of reaction of ingredients comprising formaldehyde and 4,6-diamino s-triazinyl-2 carbamyl-methyl sulfide.

10. A heat-curable resinous condensation product of ingredients comprising formaldehyde and an organic sulfide corresponding to the general formula

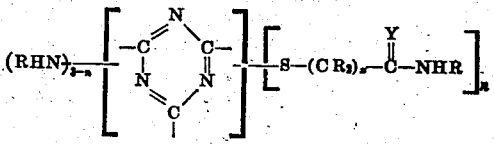

where $n$ is an integer and is at least 1 and not more than 3, $x$ is 1, R represents hydrogen and Y represents oxygen.

11. A product comprising the heat-cured resinous composition of claim 10.

12. A composition as in claim 1 wherein the reaction product is an alkaline-catalyzed reaction product of the stated components.

13. A composition as in claim 1 wherein the reaction product is an alcohol-modified reaction product of the stated components.

14. A composition comprising the product of reaction of ingredients comprising urea, a diamino s-triazinyl carbamyl-methyl sulfide and an aldehyde.

15. A composition comprising the product of reaction of ingredients comprising melamine, a diamino s-triazinyl carbamyl-methyl sulfide and formaldehyde.

16. A composition comprising the product of reaction of ingredients comprising a phenol, an aldehyde and an organic sulfide corresponding to the general formula

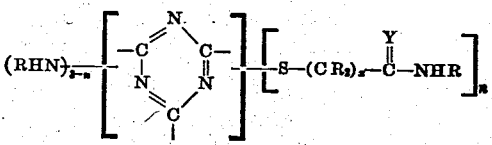

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

17. A heat-curable composition comprising the heat-convertible product of reaction of (1) a partial condensation product of ingredients comprising urea, a diamino s-triazinyl carbamyl-methyl sulfide and formaldehyde and (2) a chlorinated acetamide.

18. A product comprising the heat-cured composition of claim 17.

19. The method of preparing new condensation products which comprises effecting reaction between ingredients comprising an aldehyde and an organic sulfide corresponding to the general formula

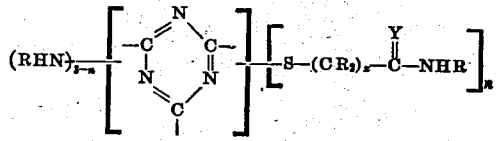

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

GAETANO F. D'ALELIO.
JAMES W. UNDERWOOD.

CERTIFICATE OF CORRECTION.

Patent No. 2,317,738.　　　　　　　　　　　　　　　April 27, 1943.

GAETANO F. D'ALELIO, ET AL.

It is hereby certified that error appears in the printed specification of the above numbered patent requiring correction as follows: Page 1, first column, line 10, for "malamine" read --melamine--; page 7, first column, line 1, for "methacholein" read --methacrolein--; and that the said Letters Patent should be read with this correction therein that the same may conform to the record of the case in the Patent Office.

Signed and sealed this 15th day of June, A. D. 1943.

Henry Van Arsdale,
(Seal)　　　　　　　　　　　　　　　　Acting Commissioner of Patents.